United States Patent [19]

Hollowell et al.

[11] 4,181,326
[45] Jan. 1, 1980

[54] VEHICLE SENSING INERTIA REEL LOCKUP INHIBITORS

[75] Inventors: William M. Hollowell, Pacific Palisades; Avraham Ziv, Sepulveda, both of Calif.

[73] Assignee: American Safety Equipment Corporation, Encino, Calif.

[21] Appl. No.: 872,306

[22] Filed: Jan. 25, 1978

[51] Int. Cl.² ............................................. B60R 21/10
[52] U.S. Cl. ........................... 280/806; 242/107.4 A; 280/803; 297/469; 297/478
[58] Field of Search ............... 280/745, 747, 744, 746; 180/82 C; 242/107.4 A; 297/388, 389

[56] References Cited

U.S. PATENT DOCUMENTS

| 3,771,814 | 11/1973 | Hahn | 280/745 |
| 3,993,328 | 11/1976 | Henderson et al. | 280/747 |
| 4,007,802 | 2/1977 | de Rosa | 280/744 X |
| 4,040,645 | 8/1977 | Giffen et al. | 280/745 |

Primary Examiner—Joseph F. Peters, Jr.
Assistant Examiner—Milton L. Smith
Attorney, Agent, or Firm—Poms, Smith, Lande & Rose

[57] ABSTRACT

An inhibitor intended for the prevention of early reel lock-up during door opening for passive vehicle safety belt systems incorporating door-mounted reels. In such systems where a high inertia mass moves a pawl into engagement with the take-up reel during emergency conditions thereby allowing freedom of occupant movement during other periods of time, biasing means are provided for resisting the movement of the high inertia mass/pawl combination when the vehicle door is in the process of being opened and closed. Embodiments disclosed include the use of a selectively activatable electromagnet, a movable permanent magnet, gravitational biasing of the pawl, spring biasing of the pawl, and spring biasing of the high inertia mass.

9 Claims, 14 Drawing Figures

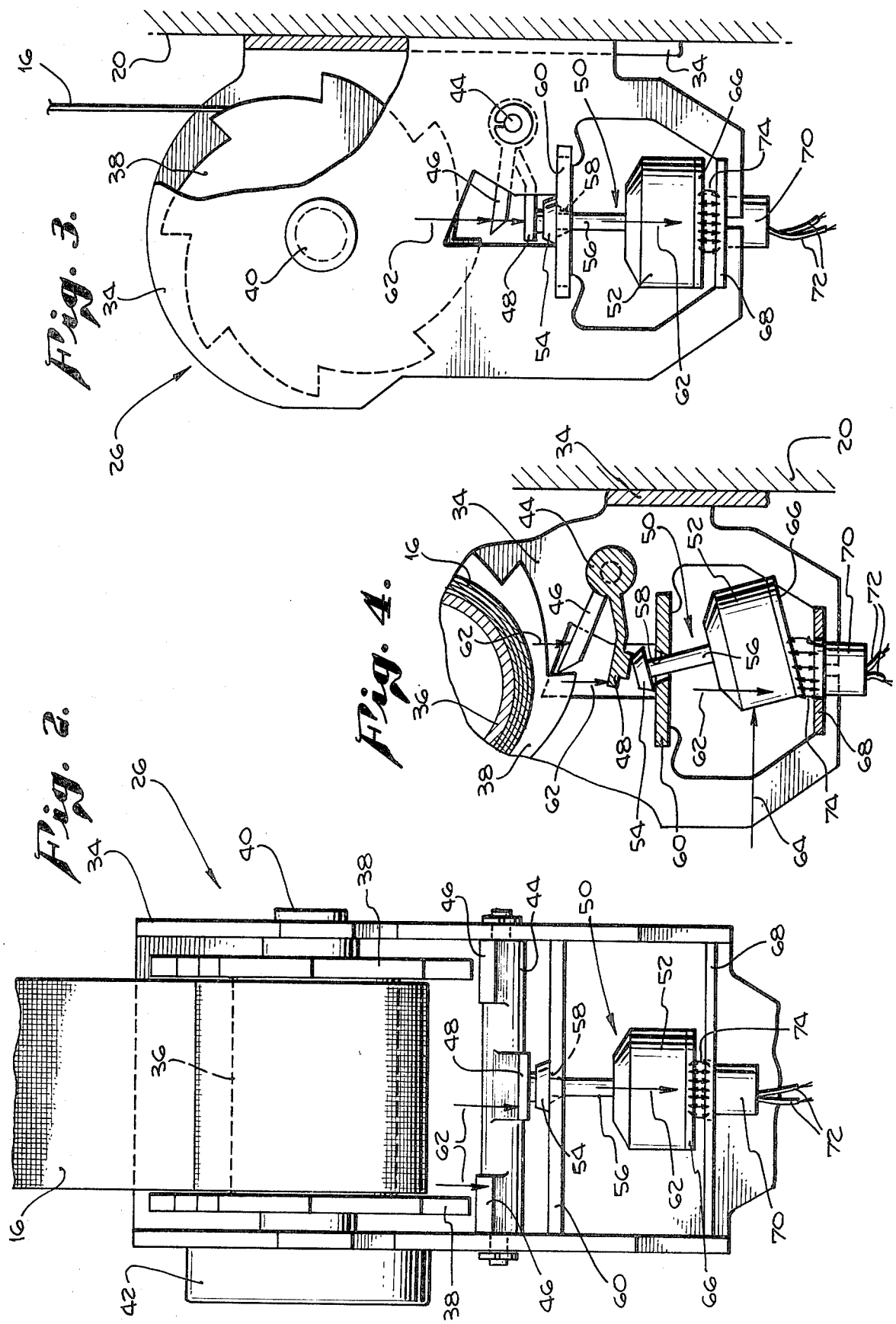

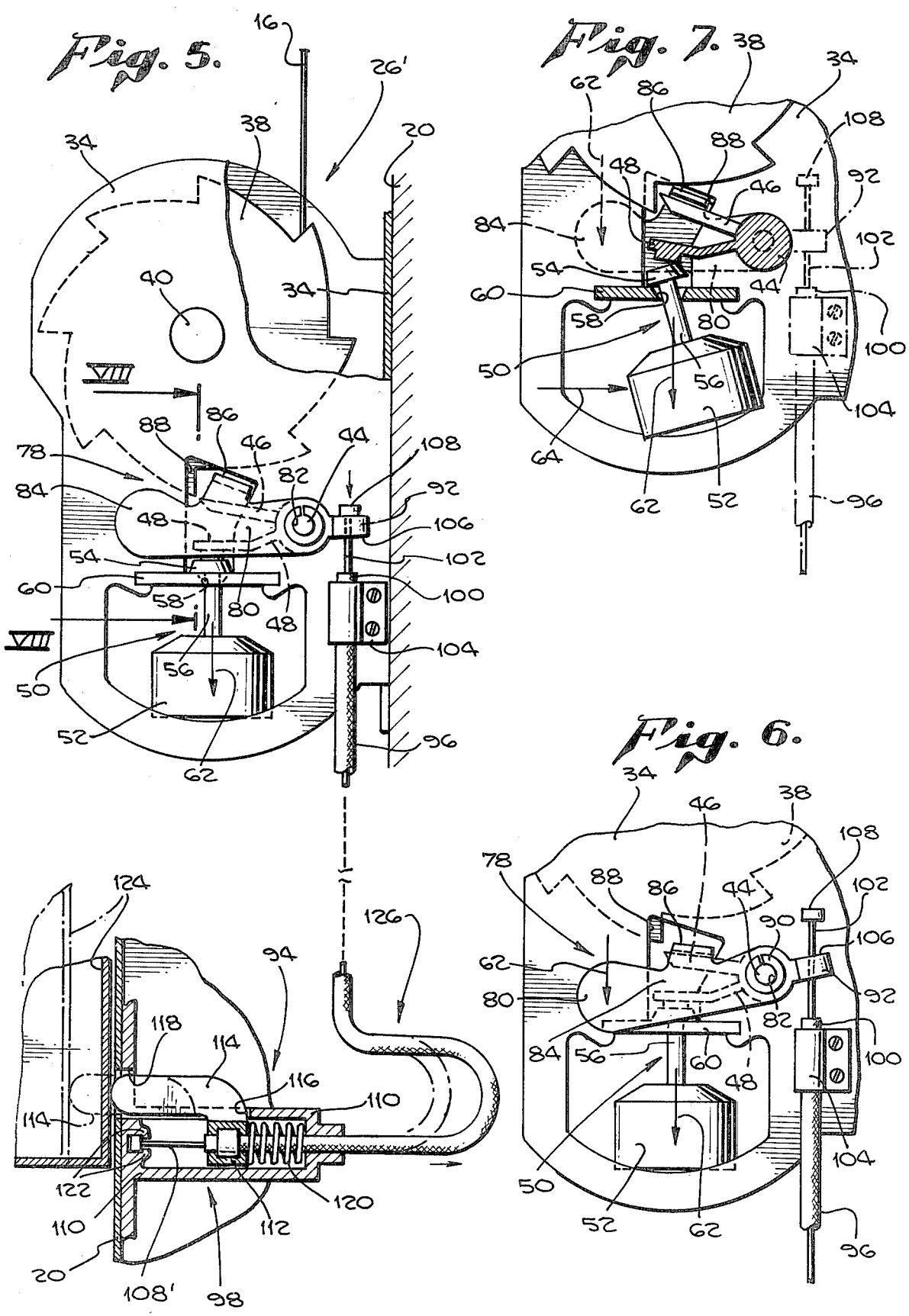

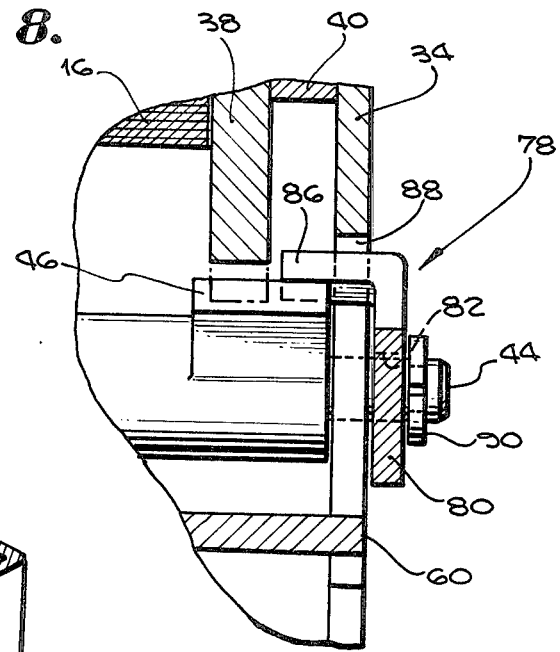
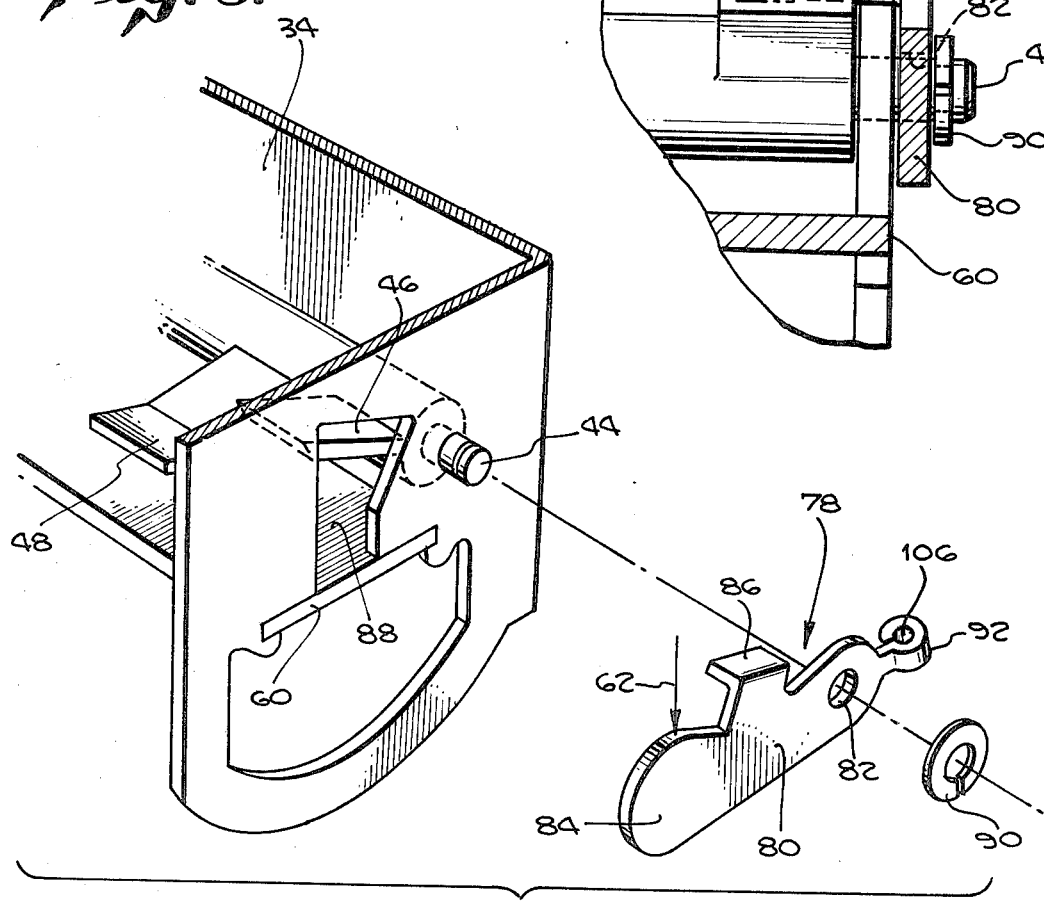
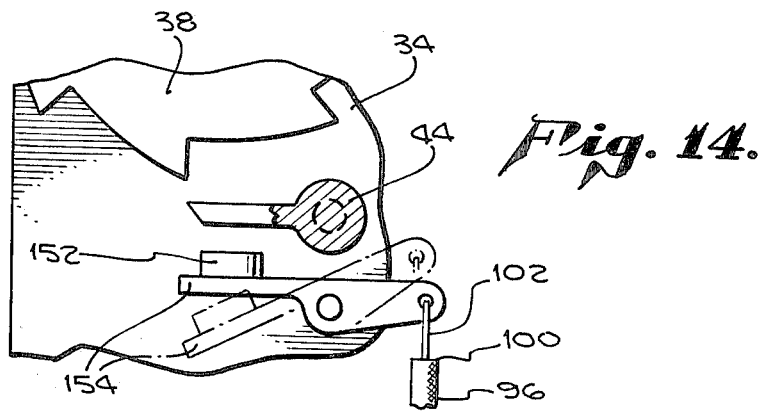

VEHICLE SENSING INERTIA REEL LOCKUP INHIBITORS

BACKGROUND OF THE INVENTION

The present invention relates to vehicle safety belt systems and, more particularly, to passive belt systems wherein the safety belt is mounted on one end to a take-up reel which locks up during emergency conditions only.

Automotive safety restraint systems come in a variety of configurations and modes of operation and are constantly under improvement with one thought in mind—to make the system more comfortable and convenient so that more people will take advantage of the life-saving and injury preventing benefits attendant their use. One major step in the development of safety belt systems was the incorporation of spring-biased take-up reels for the safety belt. That is, one end of the belt is wound on a spool rotatably journaled in a retractor frame mounted to the vehicle such that the belt is neatly wound out of the way when not in use. A more recent step in the continued improvement of safety belt systems is the incorporation of the take-up spool assembly into the vehicle door whereby the entry way into and out of the vehicle is relatively unencumbered during entry and egress by the occupants.

An example of one such safety belt system is shown in the U.S. Pat. to Henderson, et al No. (3,993,328) assigned to the common assignee of this application. In the apparatus of Henderson, et al, a single continuous loop safety belt harness assembly is provided having an adjustable releasable buckle disposed on the belt. One end of the belt is permanently affixed to the bottom of the vehicle door and the other end passes over a guide on the vehicle door above the occupant's shoulder to pass into the door to contact the retractor spool. Such an apparatus is of the "active" type wherein the occupant must affirmatively move the buckle across his or her lap into engagement with a receptacle on the opposite side thereby creating a fixed lap portion and a protractable upper torso portion. Such "active" apparatus provides no problem in entering and exiting the vehicle inasmuch as the belt must be removed by release of the buckle prior to opening the door. In such apparatus, the reel is of the type that locks in response to a sudden protraction of the belt therefrom as would occur when the upper torso of the occupant was projected forward rapidly as in an accident or emergency condition. The remainder of the time, the belt is free to be protracted and retracted gradually so as to allow the occupant freedom of upper torso movement which would be unavailable in use of a firmly attached upper torso belt.

In the U.S. Pat. to Hahn No. (3,771,814), also assigned to the common assignee of the present application, a safety belt of the so-called "passive type" is disclosed. In the apparatus of Hahn, a single lap belt is connected between an anchor in-board of the seat and a retractor spool disposed on the lower portion of the door adjacent the occupant. In such passive systems, the belt is protracted in front of the occupant as the vehicle door is opened to provide an unencumbered means for entry and exit to the vehicle. As the door is closed, however, the belt is drawn across the lap of the occupant without any action required on the occupant's part. Since the occupant plays no active part in operably positioning the safety belt, the passive connotation is applied. The retractor reel of the Hahn apparatus is of the type wherein once the belt is protracted from the spool past a minimum starting position, a slight retracting movement will cause the spool to become firmly locked against further protractive motion. Thus, the occupant is firmly held in the seat. According to the teaching of the Hahn patent in particular, means are provided for free spooling of the reel as the door is opened and closed to prevent inadvertent locking of the spool in response to non-smooth opening of the door. Without such free spooling apparatus, should the spool lock up during the door opening process, the door would have to be completely closed to the belt retracted position before the belt would again be free to be protracted so as to let the door open. Such a free spooling operation is, obviously, a necessity both for convenience and safety purposes in conjunction with such locking reels.

Referring briefly to FIG. 1, a combined safety restraint system as wherein the present invention is employed is shown as comprising a passive upper torso belt coupled with a shaped pad on the dashboard of the automobile for preventing the lower torso from sliding under the dashboard to be wedged therein. FIG. 1 will be referred to later herein for details of the present invention but, at this point, conveniently shows the environment thereof. Such an arrangement affords maximum freedom of motion for the occupant within the restraining system. As can be seen, the automobile 10 is provided with a pair of floor-mounted anchors 12 disposed at the inner side of seats 14. A retractable safety belt 16 is connected at one end to each of the anchors 12 and passes from there to a deflector 18 disposed on the door 20 at a point above the outboard shoulder of an occupant such as the driver 22 from whence it is slidably deflected downward through a slot 24 to the inside of the door 20 where it is connected onto a retractor 26. A quick release type buckle is disposed in belts 16 for release thereof by the occupant in the event of an emergency situation wherein the door 20 cannot be opened for normal egress. The dashboard, generally indicated as 30, is provided with extended and shaped pads 32 disposed to intercept the knees of the occupant to, thereby, prevent the occupant from sliding underneath dashboard 30. With the door opened, such as the passenger side door in FIG. 1, the belt 16 is protracted from the retractor 26 to be disposed across the opening to seat 14 so as to allow entry thereto by belt 16 advancing ahead of and being pushed aside by the body of the person entering to sit in the passenger seat. As the door 20 is closed, the belt 16 retracts into the retractor 26 into the position shown with relation to the driver 22 wherein the belt 16 passes from a point over the left shoulder of driver 22 across the upper torso of driver 22 to the anchor 12 adjacent the right hip of driver 22. While with passive type lap belts, such as that shown in the aforementioned patent to Hahn, it is common to use a locking retractor as retractor 26, in upper torso type belts, emergency locking retractors similar to the type described in the Henderson et al patent are more desirable. Such emergency only locking retractors provide the occupant with a maximum freedom of movement during normal non-emergency periods.

In such emergency activated retractors employed in passive safety belt systems, the door opening problem previously discussed is more critical. That is, if a locking type retractor is free spooled during a door open condition, the failure of the mechanism to attain normal operational status will be noticed by the occupant immediately upon closing the door (or leaving the door ajar) by the fact that the belt will not assume its normal locked position. By contrast, in the emergency activated retractor, the occupant would be unaware of a maintained free spooling status until such time as the safety belt retractor did not lock during an emergency situation.

Wherefore, it is the object of the present invention to provide an emergency only locking safety belt retractor adapted for allowing the vehicle door to be opened without inadvertent locking of the retracting mechanism while never completely overriding the retractor's normal emergency activated locking mechanism.

SUMMARY

The foregoing objective of the present invention has been successfully applied to safety belt retractors of the type wherein the belt spool of the retractor has locking means activated by inertia sensor means by the provision of means operated in response to movement of the vehicle door for changing the value of the rate of acceleration or deceleration required of the inertia sensor means to cause actuating of the locking means. In particular, the preferred embodiment is applied to a safety belt retractor of the type having a safety belt wound on a spool rotatably journaled in a retractor frame mounted to the door of the vehicle having a movable pawl for engaging the spool to prevent protraction of the safety belt and a high inertia mass for moving the pawl into engagement with the spool during periods of high lateral acceleration or deceleration forces on the mass as imposed in emergency conditions wherein the improvement comprises sensing means for sensing when the vehicle door is in its closed position; and, biasing means connected to the sensing means for biasing the mass to resist moving the pawl into engaging the spool when the door is not in its closed position.

DESCRIPTION OF THE DRAWINGS

FIG. 2 is a cut-away front elevation of a seat belt retractor of the inertia activated type showing an electromagnetically operated embodiment of the present invention.

FIG. 3 is a partially cut-away side elevation of the retractor of FIG. 2 showing the spool thereof in its unlocked position.

FIG. 4 is a partially cut-away side elevation of the inertia sensor and pawl of the apparatus of FIG. 2 and 3 in its locked position.

FIG. 5 is a side elevation of a retractor according to the present invention incorporating gravitational biasing means against the pawl shown in the "door closed" position with the spool in an unlocked state.

FIG. 6 is a side elevation of the apparatus of FIG. 5 as it would appear in the "door opened" position and unlocked.

FIG. 7 is a partially cut-away side elevation of the apparatus of FIG. 5 as it would appear in a "door opened" condition with the spool being locked.

FIG. 8 is a detailed partially cut-away front elevation of the apparatus of FIG. 5 in the plane VIII—VIII.

FIG. 9 is an exploded view of the gravity biasing member of the apparatus of FIG. 5.

FIG. 14 is a simplified drawing of the pawl and spool of a retractor showing a permanent magnet embodiment of the present invention applied thereto.

DESCRIPTION OF THE PREFERRED EMBODIMENT

Figure 1:
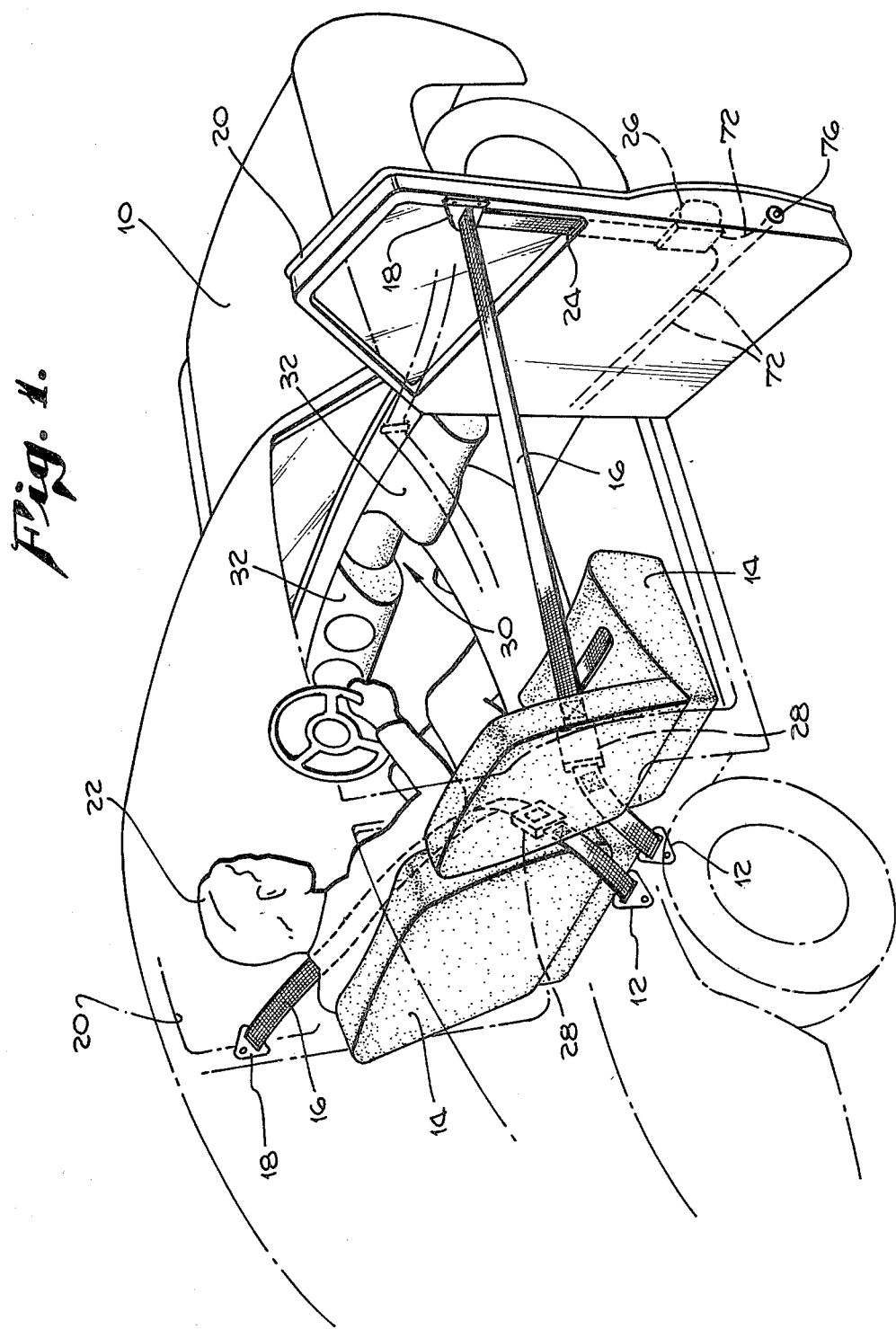
FIG. 1 is a partially cut-away simplified drawing of an automobile showing the environment wherein the present invention is applicable.

A first exemplary embodiment of the present invention is shown with reference to FIGS. 2, 3 and 4. The retractor generally indicated as 26 comprises a generally U-shaped frame 34 mounted to door 20 having a spool 36 rotatably journaled therein upon which the safety belt 16 is wound. The spool 36 is provided with a toothed rim 38 disposed on either side of belt 16 adjacent the point of mounting of spool 36 to frame 34. One end of the rotatable mounting axis 40 of spool 36 is connected to a spring (not shown) within a spring housing 42 adapted to retract belt 16 onto spool 36. A rotatable locking shaft is rotatably journaled to frame 34 below and in spaced relationship to toothed rim 38. Rotatable locking shaft 44 has a pair of locking pawls 46 extending substantially horizontally therefrom disposed under respective ones of the two toothed rims 38. By rotating locking shaft 44 to raise the locking pawls 46, locking pawls 46 engage toothed rims 38 to prevent the further protraction of belt 16. Rotatable locking shaft 44 is activated by an activating lever extending from rotatable locking shaft 44 substantially at the center thereof in the same direction as locking pawls 46 in combination with an inertial activator indicated generally as 50. Inertial activator 50 comprises a high inertia mass 52 suspended from a tipable head 54 by a shaft 56 passing through a hole 58 disposed in a support plate 60 connected to frame 34 in parallel spaced relationship to locking shaft 44. As shown in FIG. 2, retractor 26 is in its unlocked position wherein tipable head 54 is lying flat against support plate 60 with activating lever 48 resting on the top thereof due to the force of gravity (indicated by the arrows labeled 62). In the unlocked position as shown in FIG. 2, locking pawls 46 are disposed to clear the toothed rim 38. Tipable head 54 tends to stay firmly seated against support plate 60 because of the relatively broad base thereof in combination with the force of gravity acting through the high inertia mass 52 normal to support plate 60.

When subject to a high lateral force such as indicated by arrow 64, high inertia mass 52 is swung in the manner of a pendulum about the rim of tipable head 54 as shown in FIG. 4. In so doing, activating lever 48 is raised by tipable head 54 which, in turn, rotates locking shaft 44 to raise locking pawls 46 into engagement with toothed rim 38. One prime advantage of such locking apparatus is that following the emergency condition, inertial activator 50 will return to its unlocked position due to the force of gravity and the lack of a lateral force which, in turn, causes locking pawls 46 to disengage toothed rims 38 to allow the occupant freedom of movement once again to effect escape from the vehicle if necessary. It will be apparent to the observer that any lateral force on high inertia mass 52 capable of moving inertial activator 50 to the position of FIG. 4 will lock retractor 26. It will likewise be obvious that such a force can be created by the rapid opening of the door of the vehicle. In the embodiment of FIGS. 2 through 4, in order to effect the teachings of the present invention, high inertia mass 52 includes at least a portion indicated as 66 which is of a magnetically attractable material such as soft iron. A mounting plate 68 is disposed adjacent magnetic portion 66 in spaced relationship thereto. An electromagnet 70 is mounted in mounting plate 68 in adjacent spaced relationship to magnetic portion 66. As previously mentioned, inertial activator 50 is normally maintained in its unlocked position of FIGS. 2 and 3 by the force of gravity acting on the pendulum mounted high inertia mass 52. By applying an appropriate electric current to the leads 72 connected to electromagnet 70 an attractive force 74 is created between electromagnet 70 and magnetic portion 66 acting in the same direction as gravity thereby causing high inertia mass 52 to act as if it were of greater mass than actually present and, thereby, resist movement to the locked position of FIG. 4.

In order to accomplish the objectives of the present invention, sensing means must be provided for sensing when the door of the vehicle is completely closed and when it is not closed (i.e. being opened or closed). The electromagnetic embodiment of the present invention can conveniently be activated in a manner similar to that shown in FIG. 1. A push-button type sensor 76 is disposed in the edge of door 70 being of a normally closed and pushed in to open type switch configuration. Sensor switch 76 is connected in series with leads 72. Leads 72 with sensor switch 76 in series therewith are connected on the opposite end to the electrical system of the automobile 10 (not shown). Thus, any time sensor switch 76 is not disposed adjacent the door jam of car 10, electrical continuity is established through electromagnet 70 to impede the tipping motion of inertial activator 50. The electrical embodiment of the present invention thus described has the additional advantage that electricity flows through electromagnet 70 and leads 72 any time the door 20 is in an open or ajar position. Thus, the interior light of the automobile and/or "door ajar" indicators can conveniently be connected into leads 72 to operate in conjunction therewith.

Turning now to FIGS. 5 through 9, a completely mechanical embodiment of the present invention is shown. For convenience, in the retractor 26' of FIGS. 5 through 9 like parts to the previously described embodiment are designated with like number. While the technique of the present invention is equally applicable to other types of inertia activated retractors well known in the art, the embodiments disclosed herein are all shown relative to the pendulum type high inertia mass activator previously described. The resistive force of this embodiment is provided by a gravity biasing member generally indicated as 78 rotatably journaled on rotatable locking shaft 44 as can best be seen with reference to FIGS. 8 and 9. It is to be understood that biasing member 78 could be mounted elsewhere but that it is convenient to mount it on an extension of locking shaft 44 as shown. Gravity biasing member 78 comprises a flat plate body 80 having a hole 82 adjacent one end thereof for mounting body 80 on an extension of rotatable locking shaft 44 extending beyond frame 34. Flat plate body 80 is sized to have a heavy portion 84 at the furthest point from hole 82 to provide the maximum rotational force about hole 82 when body 80 is mounted on shaft 44 due to the force of gravity as again indicated by arrows 62. Intermediate heavy portion 84 and hole 82 a pawl engaging tab 86 is disposed to pass through an appropriately positioned opening 88 in the side of frame 34 whereby a portion of tab 86 can engage pawl 46 in a manner best seen with reference to FIG. 8. A disengaging loop 92 is disposed to extend from body 80 in a direction opposite heavy portion 84 to be used in a manner to be hereinafter described. As will be understood, with body 80 mounted on locking shaft 44 with tab 86 engaged with pawl 46, an additional force will be created in inertial activator 50 tending to maintain activator 50 in its unlocked position by the force of gravity acting on heavy portion 84 transmitted through tab 86 to pawl 46 thence to shaft 44, in turn to activating lever 48 against tipable head 54 tending to maintain tipable member 54 against support plate 60. Since tipable head 54 and high inertia mass 52 are rigidly interconnected by shaft 56, any force downward on tipable head 54 tending to hold tipable head 54 against support plate 60 is effectively a biasing force against high inertia mass 52 helping inertial activator 50 resist movement from the unlocked to the locked position.

As with the electromagnetic embodiment previously described, the mechanical embodiment of the present invention requires a sensor adapted to sense when the vehicle door is closed and to deactivate the gravity biasing member 78 at such time. Such apparatus is shown with particular reference to FIG. 5. The sensing apparatus indicated generally as 94 comprises a sheathed cable 96 connected between the disengaging loop 92 previously discussed on one end and an actuator generally indicated as 98 on the opposite end. In the usual manner, sheathed cable 96 comprises a longitudinally rigid conduit sheath 100 through which a flexible cable 102 is passed. Such cables have the characteristic that if the longitudinal position between the ends of the sheath 100 and cable 102 are changed at one end of the sheathed cable 96, the sheath 100 and cable 102 will move in longitudinal displacement at the opposite ends thereof by an equal and opposite amount. In the present application, the conduit sheath 100 is attached to frame 34 as with a clip 104 adjacent disengaging loop 92 in close spaced adjacent relationship thereto. Disengaging loop 92 has a hole 106 therein concentrically aligned with sheath 100. Flexible cable 102 emerging from sheath 100 adjacent disengaging loop 92 is disposed to pass through hole 106 and has a stop collar 108 attached to cable 102 adjacent the upper surface of disengaging loop 92. Actuator 98 comprises a housing 110 attached to door 20 such as in the position of sensor switch 76 of FIG. 1. Housing 110 is cylindrical in shape having a movable member 112 disposed for longitudinal movement therein. Movable member 112 has an actuator tab attached thereto passing through a slot 116 in the side of housing 110 and disposed to pass through a hole 118 in door 20. A spring 120 is disposed within housing 110 and acts on movable member 112 to urge movable member 112 and actuator tab 114 attached thereto close adjacent door 20 causing actuator tab 114 to extend through hole 118 to project beyond the surface of door 20 as shown by the ghosted position of FIG. 5. Spring 120, actuator tab 114, and movable member 112 are further adapted such that actuator tab 114 can be pushed back through hole 118 against the biasing action of spring 120 into the non-ghosted position of FIG. 5.

To accomplish the sensing objectives of the present invention, sheathed cable 96 passes through the end of housing 110 concentrically through helical spring 120 and through movable member 112 where conduit sheath 120 is connected to movable member 112. Flexible cable 120 extends beyond the end of conduit sheath 100 to be engaged with housing 110 as by a second stop collar 108' attached thereto being gripped by resilient gripping fingers 122 as shown. With the door in its closed position, the apparatus takes the position shown in FIG. 5. That is, actuator tab 114 is pushed into hole 118 by the proximity of the automobile door jam indicated as 124. In so doing, stop collar 108' is longitudinally disposed from the end of movable member 112 by the sliding of conduit sheath 100 along flexible cable 102. As so positioned, stop collar 108 is drawn to its closest proximity to the end of conduit sheath 100 adjacent clip 104. In this position, the force of stop collar 108 against the top of disengaging loop 92 is sufficient to overcome the force of gravity on heavy portion 84 of gravity biasing member 78 whereby gravity biasing member 78 is rotated in a clockwise direction such that pawl engaging tab 86 is completely disengaged from pawl 46. The inertial activator 50 is, thereby, rendered in its normal or most sensitive condition as desired when the vehicle door is closed. When the door is opened, the door jam 124 is disposed away from door 20 as indicated by the ghosted position of FIG. 5. Actuator tab 114 is then free to extend through hole 118 under the biasing force of spring 120 as also shown in the ghosted position of FIG. 5. In so doing, movable member 112 and conduit sheath 100 connected thereto are moved close adjacent stop collar 108' thus reducing the distance therebetween. To provide operability, sheathed cable 96 is provided with a looped portion 126 which moves to the ghosted position of FIG. 5. As previously stated, if the longitudinal displacement between the conduit sheath 100 and flexible cable 102 on one end is changed, the displacement on the opposite end will change by an equal and opposite amount. Thus, as movable member 112 moves towards stop collar 108', stop collar 108 will move away from clip 104 an equal and opposite amount. The gravity biasing member 78 will then assume the condition shown in FIG. 6 wherein the tendency of gravity biasing member 78 to rotate counter-clockwise under the influence of gravity will be translated through pawl engaging tab 86 to pawl 46 in the manner previously described as desired during door opening and closing operations. As can be seen from FIG. 7, with the gravity biasing member 78 in its operable state as shown in FIG. 6 during a door opening and closing operation, in order for inertial activator 50 to raise pawl 46 into engagement with toothed rim 38, gravity biasing member 78 must be rotated clockwise against the force of gravity as well.

Figure 10:
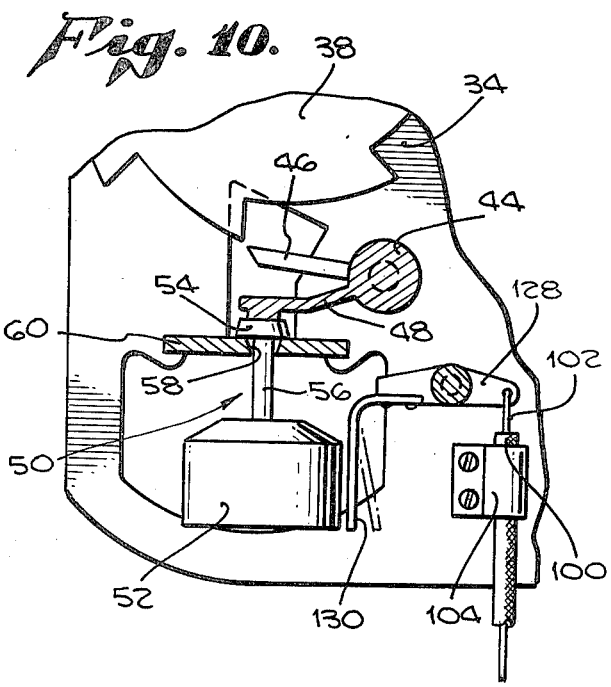
FIG. 10 is a partially cut-away side elevation of the inertia activating mechanism of a retractor employing a spring biasing embodiment of the present invention in its "door opened" state.
Figure 11:
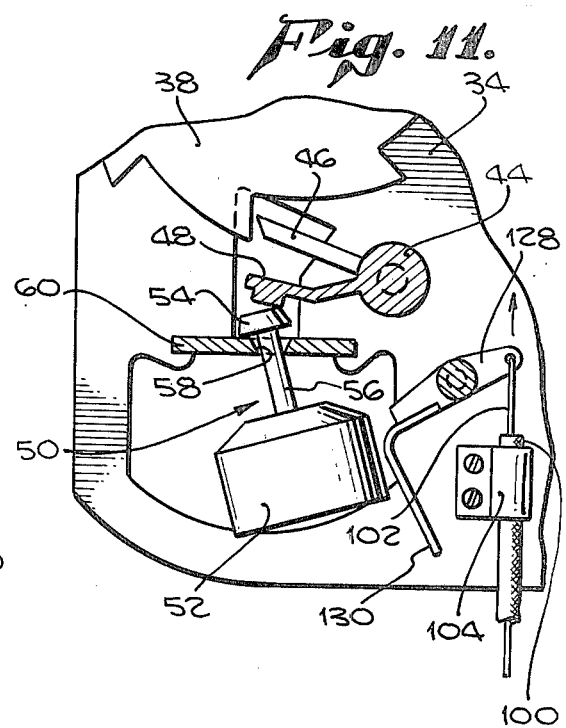
FIG. 11 is a partially cut-away side elevation showing the apparatus of FIG. 10 in its "door closed" state.

A simplified drawing of a second mechanical embodiment employing the cable actuator previously described is shown in FIGS. 10 and 11. The apparatus of FIGS. 10 and 11 is designed to resist displacement of the inertial activator 50 in only one direction. As shown, the end of flexible cable 102 adjacent inertial activator 50 is connected to one side of a lever 128 pivotally attached to frame 34. A spring biasing member 130 is connected to the opposite side of lever 128 and disposed to urge high inertia mass 52 in a direction opposite that in which motion is desired to be impeded. As shown in FIG. 10, spring biasing member 130 and lever 128 are in their door opened position. As shown in FIG. 11, spring biasing member 130 and lever 128 are retracted to their door closed position wherein spring biasing member 130 is disposed completely out of contact with high inertia mass 52. Spring biasing member 130 is of a flexible material whereby when in the door opened position of FIG. 10, spring biasing member 130 can be flexed to the ghosted position to allow operable movement of high inertia mass 52 at a second, higher, level of actuation force.

Figure 12:
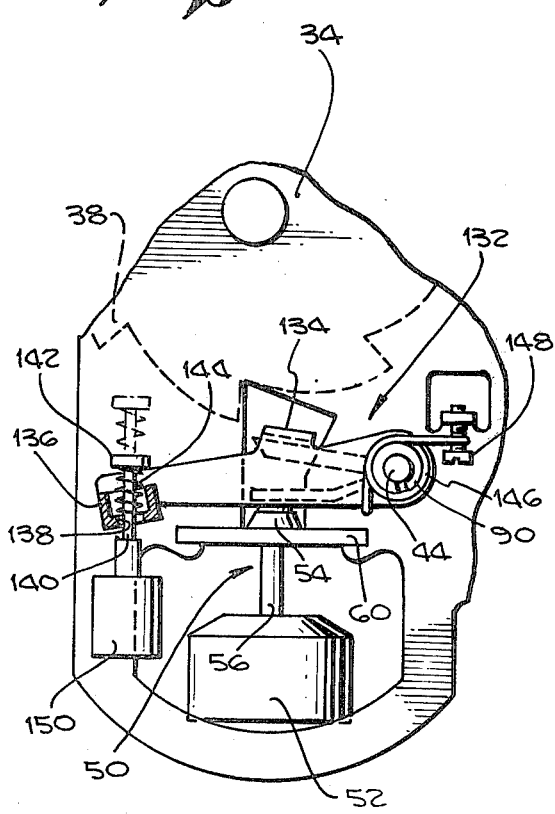
FIG. 12 is a second spring biased embodiment of the present invention as applied to an inertia activated retractor shown in its "door opened" state.
Figure 13:
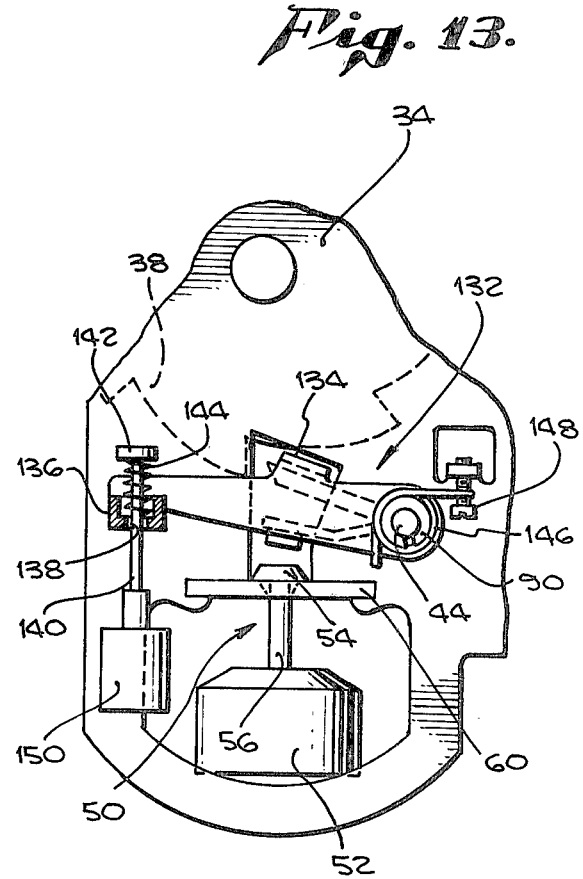
FIG. 13 is a partially cut-away side elevation of the apparatus of FIG. 12 shown in its "door closed" state.

A third mechanical embodiment of the present invention is shown with reference to FIGS. 12 and 13 wherein the apparatus for biasing the inertial activator 50 is shown in its door opened and door closed positions respectively. In the apparatus of FIGS. 12 and 13, a biasing member shown generally as 132 is mounted for rotation on rotatable locking shaft 44 in a manner similar to biasing member 78 of FIGS. 5 through 9. Also in like manner, biasing member 132 includes a pawl engaging tab 134 for applying a biasing force against the edge of locking pawl 46 in the same manner as pawl engaging tab 86 of the embodiment of FIG. 8. Whereas the gravity biasing member 78 contained a weighted end 84 supplying a constant rotational force which had to be removed by an opposite force applied through disengaging loop 92, biasing member 132 of FIGS. 12 and 13 has a removable biasing force. That is, on the end opposite the mounting of biasing member 132 to rotatable locking shaft 44, a cup 136 is disposed having a hole 138 through the bottom thereof. A vertical longitudinally movable shaft 140 is disposed to pass through hole 138 and has a stop collar 142 disposed on the end thereof. A helical biasing spring 144 is disposed concentrically about shaft 140 between stop collar 142 and the bottom of cup 136. As can be seen, by raising shaft 140 to the ghosted position, biasing member 132 is free to rotate in a clockwise direction under the normal reaction of inertial activator 50. When lowered to the normal position of FIG. 12, however, biasing spring 144 provides an additional counter-clockwise biasing force which must be overcome by biasing member 132 in order to have locking pawls 46 engage toothed rim 38. Since biasing member 132 possesses some weight in the form of cup 136 acting in a similar manner to gravity biasing member 78 of the embodiment of FIGS. 5 through 9, an offsetting spring 146 is disposed to provide a clockwise bias to biasing member 132 to offset the counter-clockwise bias produced by the weight of biasing member 132. This is conveniently accomplished in the manner shown wherein offsetting spring 146 is disposed concentrically about rotatable locking shaft 44 with one end disposed to grip the lower surface of biasing member 132 and the other end connected to an adjusting screw 148 whereby when adjusting screw 148 is moved longitudinally in and out, the biasing force of offsetting spring 146 against biasing member 132 can be adjusted. Additionally, while helical biasing spring 144 should be chosen to apply a preselected biasing force against locking pawl 46, adjusting screw 148 allows the actual biasing force to be a combination of the effect of biasing spring 144 and offsetting spring 146 thereby making the biasing force in the door opened position adjustable. In the simplified drawing of FIGS. 12 and 13, longitudinal extension and retraction of shaft 114 is indicated as being accomplished by an actuator 150 to which shaft 140 is operably connected. In actual implementation of the embodiment of FIGS. 12 and 13, actuator 150 could employ the sheathed cable mechanical actuator of the previous mechanical embodiments described herein or could use an electric solenoid actuated by a push-button sensor switch such as 76 of FIG. 1 or a vacuum motor operated by engine vacuum of the vehicle and controlled by an appropriate vacuum operating switch positionally disposed similar to push-button sensor switch 76 of FIG. 1.

Yet another mechanical embodiment of the present invention is shown with respect to the simplified drawing of FIG. 14. In this embodiment, the biasing force impeding the locking pawls 46 from engaging toothed rim 38 during periods when the vehicle door is being opened or closed is provided by a permanent magnet 152 disposed on an actuator arm 154 to be brought into and out of attractive proximity to locking pawls 46. It is to be understood that in such embodiment, locking pawls 46 would, by necessity, be of a magnetically attractable material. As with the lever 128 of the embodiment of FIGS. 10 and 11, actuator arm 154 can conveniently be moved between its door opening/closing and normal operating positions as shown in FIG. 14 by the full and ghosted positions respectively through the mechanical actuator employing the sheathed cable 96. It should also be noted that the permanent magnet 152 and actuator arm 154 of FIG. 14 could also be positioned in like manner to the electromagnet 70 of FIGS. 2–4 to selectively attract a magnetically attractable portion 66 of high inertia mass 52 by moving magnet 152 into and out of close proximity to portion 66.

From the foregoing embodiments thus described, it will be apparent that the present invention has thus met its stated objectives of providing an improvement to door mounted passive safety belt retractors locked in response to lateral forces produced in an emergency condition by an inertial activator employing a high inertia mass by selectively applying a biasing force tending to resist or impede but not prevent, movement of the mass during door opening and closing such that undesired locking of the reactor during door opening and closing is prevented but wherein the second level activation force required to lock the belt is maintained below that which would be encountered in an emergency condition whereby the retractor is never locked out of its normal operation capability.

We claim:

1. In a safety belt retractor of the emergency locking type having a safety belt wound on a spool rotably journaled in a retractor frame mounted to a part of a vehicle which is intentionally movable relative to the vehicle, such as the vehicle door, and inertia responsive locking means for locking the spool to prevent belt protraction in the event of an emergency condition, said locking means including an inertia sensor means for actuating said locking means in response to forces exerted thereon due to a rate of acceleration or deceleration thereof of more than a predetermined value, the improvement comprising the provision of:
   means operated in response to movement of said vehicle part in a predetermined manner for changing the value of the rate of acceleration or deceleration required of said inertia sensor means to cause actuating of said locking means in response to movement of said vehicle part in a single direction only.

2. The improvement in safety belt retractors of claim 1 wherein said vehicle part is a door of the vehicle and said operated means comprises resilient finger means for contacting said inertia sensor means to increase said predetermined value of rate of acceleration or deceleration required of said inertia sensor means to a second higher value in said single direction in response to opening of the vehicle door and for returning it to said predetermined value on the closing of the vehicle door.

3. The improvement in safety belt retractors of claim 1 wherein said operated means comprises:
   means for increasing the value of the rate of acceleration or deceleration required to cause lockup of said locking means to a value which is about equal to or exceeds the maximum value experienced by the sensor means due to intentional movement of said vehicle part during normal non-emergency operations thereof in said single direction and for allowing said locking means to continue to be responsive to vehicle rates of acceleration or deceleration in its normal manner in all other directions.

4. The improvement in safety belt retractors of claim 1 wherein said inertia sensor means comprises a movable mass and said operating means comprises:
   resilient finger means for releasably contacting said mass to inhibit, but not prevent, movement of said movable mass of said inertia sensor means.

5. The improvement in safety belt retractors of claim 4 wherein said inertia sensor means additionally comprises:
   means for actuating said resilient finger means to and from an inhibiting position relative to said mass in response to said movement of said vehicle part in said predetermined manner.

6. In a safety belt retractor having a safety belt wound on a spool rotatably journaled in a retractor frame mounted to a movable part of a vehicle, such as the vehicle door, and spool locking means responsive to changes in inertia experienced by the retractor to lock the safety belt against rotation relative to the frame in the event of an emergency condition experienced by the vehicle, the improvement comprising the provision of:
   means for inhibiting, but not for preventing, lockup of said spool locking means in a single direction under the conditions normally experienced by said retractor during non-emergency movements of said vehicle part in said single direction.

7. In a safety belt retractor of the type having a safety belt wound on a spool rotatably journaled in a retractor frame mounted to the door of a vehicle having a movable pawl for engaging the spool to prevent protraction of the safety belt and a high inertia mass for moving the pawl into engagement with the spool during periods of high lateral acceleration or deceleration forces on the mass as imposed in emergency conditions, the improvement for resisting the non-emergency engaging of the spool by the pawl normal opening and closing of the vehicle door comprising:
   (a) sensing means for sensing when the vehicle door is in its closed position; and,
   (b) biasing means connected to said sensing means for biasing the mass in a single direction corresponding to the forces on the mass caused by the door being opened to resist, but not prevent, moving the pawl into engaging the spool when the door is not in its closed position.

8. In a safety belt retractor of the type having a safety belt wound on a spool rotatably journaled in a retractor frame mounted to the door of a vehicle having a movable pawl for engaging the spool to prevent protraction of the safety belt and a high inertia mass for moving the pawl into engagement with the spool during periods of high lateral acceleration or deceleration forces on the mass as imposed in emergency conditions, the improvement for resisting the non-emergency engaging of the spool by the pawl during normal opening and closing of the vehicle door comprising:

(a) sensing means for sensing when the vehicle door is in its closed position; and,
(b) spring means connected to said sensing means for movement thereby between a first position in contact with the mass to resist, but not prevent, moving the pawl into engaging the spool from forces in the door opening direction when the door is not closed and a second position not in contact with the mass when the door is closed.

9. The improvement in safety belt retractors of claim 8 wherein:

said spring means comprises a resilient finger of spring material.

* * * * *